No. 834,229. PATENTED OCT. 23, 1906.
V. W. BLANCHARD.
GAS COOKING STOVE AND RANGE.
APPLICATION FILED JAN. 22, 1906.
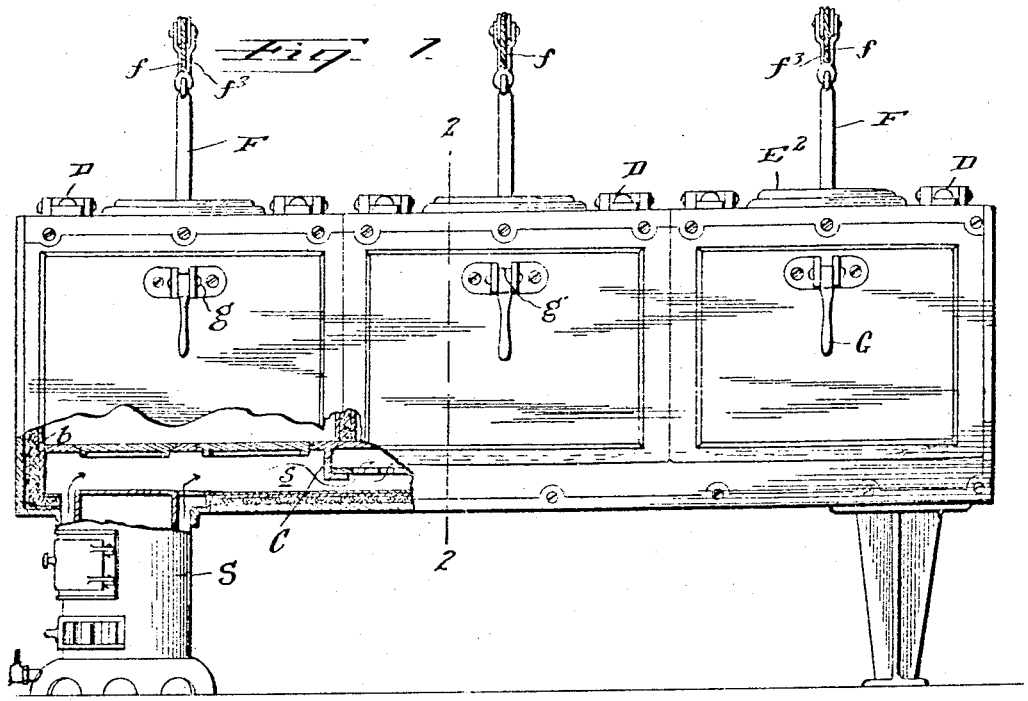
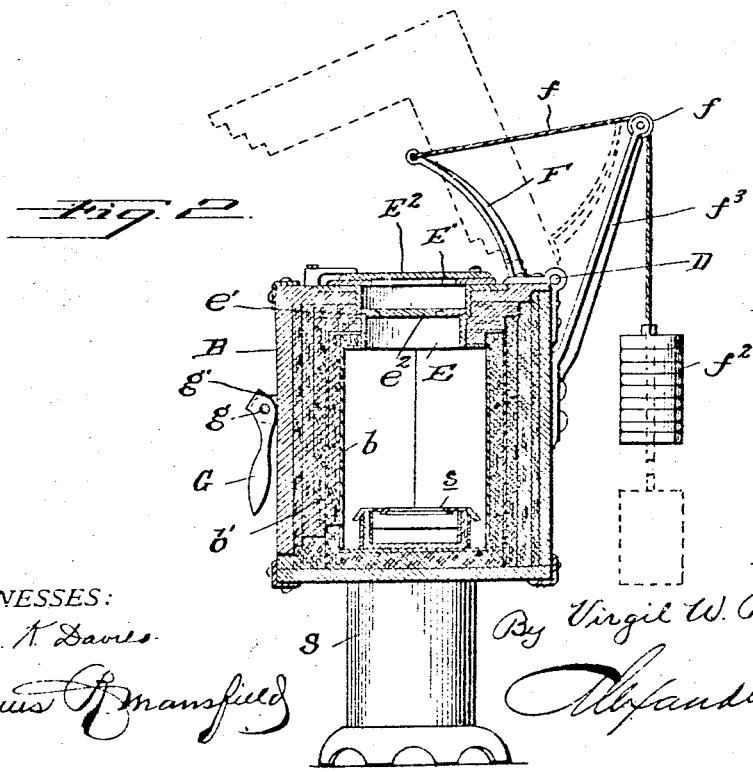
WITNESSES:
Chas. N. Davis
James R. Mansfield
INVENTOR
Virgil W. Blanchard.
By Alexander T. Lowell
Attorneys

UNITED STATES PATENT OFFICE.

VIRGIL W. BLANCHARD, OF NEW YORK, N. Y.

GAS COOKING STOVE AND RANGE.

No. 834,229.

Specification of Letters Patent.

Patented Oct. 23, 1906.

Application filed January 22, 1906. Serial No. 297,278.

*To all whom it may concern:*

Be it known that I, VIRGIL W. BLANCHARD, of New York, in the county of New York and State of New York, have invented certain new and useful Improvements in Gas Cooking Stoves and Ranges; and I hereby declare that the following is a full, clear, and exact description thereof, reference being had to the accompanying drawings, which form part of this specification.

This invention is an improvement in gas cooking stoves and ranges, and has particular reference to the ovens of such stoves, which oven in the present invention is designed to be heated by the hot products of combustion discharged directly thereinto from the upper portion of the stove.

The improved oven is so constructed that any compartment thereof may be quickly opened up in such manner that the chef can use the inclosed portion of the stove-range for culinary purposes just as though the oven were not in place. When closed, the several compartments can be heated to different temperatures, if desired, by properly regulating the amount of heating-gases supplied thereto, so that articles requiring different temperatures can be cooked in the several compartments, and some of the compartments are so constructed that the heat can be stored in the walls thereof, and, if desired, the food can be cooked by the stored or accumulated heat after the fire has been extinguished. The invention will be fully understood from the following description, and the parts and combination of parts for which protection is desired herein are set forth in the claims.

In the drawings, Figure 1 is a front elevation, partly broken away, of the complete range. Fig. 2 is a transverse section thereof on line 2 2, Fig. 1, showing the oven closed in full lines and open in dotted lines.

The apparatus comprises a stove S, which is preferably constructed as described in my application for gas cooking stoves and ranges, Serial No. 297,251, filed January 22, 1906, and has a horizontal range extension $s$ connected with its upper end, into which the heated gases are discharged and through which they pass. The said range extension $s$ is provided with a series of openings in its top, which may be closed by removable lids of the usual construction, and, as indicated in the dotted line, will have six openings two in each compartment of the oven.

The upper part of the stove and the range extension thereof are preferably closed within the oven-walls, the upper part of the stove forming the bottom of the compartments of the oven, as indicated in Figs. 1 and 2. The oven preferably has its top and side walls lined internally with metal, as at $b$, and exteriorly cased in wood, as at B, and the space between the lining $b$ and casing B is filled with layers of asbestos or other suitable non-heat-conducting material $b'$, so that loss of heat by conduction or radiation through the walls of the oven will be prevented.

The bottom of the oven, which underlies the range extension $s$, is also preferably lined with non-heat-conducting material to conserve the heat in the oven. By this construction of the walls a large amount of heat will be accumulated or stored up therein, and, if desired, cooking operations can be performed in different compartments by accumulated heat or can be performed by live heat directly admitted into the compartments through the openings in the top of the range $s$. As all the heat generated in the stove S is delivered into the oven, it will be obvious that great economy in fuel can be realized.

In this construction of cooking-range the oven, as shown, may be divided into three compartments by means of internal partitions C, and the front and top wall of each compartment is preferably made openable, and, as indicated in Fig. 2, the top and front walls of each compartment are rigidly united, and the top wall is hinged to the rear wall, as at D, so that the top and front can be thrown upward, as indicated in dotted line in Fig. 2, thereby uncovering the portion of the range within the compartment and enabling cooking utensils to be placed on the range, and, if desired, such part of the range to be used as if the oven were not in place. When the compartment is to be used, the top and front are closed down again, as indicated in full lines in Fig. 2, during cooking operations.

In the top of each compartment is an opening E, which is preferably surrounded by a metal cylinder having a ledge $e'$, on which can be placed removable lids $e^2$, and the top of the opening E may be closed by a plate $E'$, having an opening closable by a valve $E^2$. By this means after the compartment is closed the plate $E'$ can be removed and utensils can be placed on the lid $e^2$ or in place of the lid and cooked by the heat in the oven.

Also by removing the covering and lids articles can be put in or removed from the compartments through openings E. Preferably the joints between the hinged portions and stationary portions of the compartments are so formed as to prevent waste of heat therethrough. To facilitate opening up the compartments, I attach to the hinged top member of each compartment a forwardly-curved arm F, whose extremity is connected to a chain or cord $f$, running over a pulley $f''$ to a counterbalancing-weight $f^2$, the pulley $f''$ being mounted on a bracket $f^3$, attached to the rear wall of the casing, as shown, and I also attach to the front wall of the compartment a handle G, pivoted on a bracket $g$, so as to hang closed against the front wall of the compartment; but the upper end of the handle is beveled, as shown at $g'$, so that when the handle is grasped and pulled outwardly or upwardly its upper end will bind against the bracket, and then the further pull on the handle will swing up the front and top wall of the compartment, as indicated in Fig. 2, the counterbalancing-weight enabling the operations of opening or closing the compartment to be accomplished in an easy manner.

Having thus described my invention, what I therefore claim as new, and desire to secure by Letters Patent thereon, is—

1. The combination of a gas-burning stove having a range extension; with an oven inclosing the range extension of the stove and divided into compartments by interior partitions, the front and top walls of each compartment being openable and rigidly connected together and the top of each compartment being hinged at its rear edge to the rear wall of the oven, whereby any compartment can be opened up without opening others.

2. The combination of a gas-burning stove having a range extension, an oven inclosing the range extension of the stove and divided into compartments by partitions, the front and top wall of each compartment being openable and rigidly connected together, the top wall being hinged at its rear edge to the rear wall of the oven whereby any compartment can be opened up, each compartment also having an opening in its top, a closure for such opening, and means to assist in raising the top and front of each compartment.

3. The combination of a gas-burning stove having a range extension, an oven above the range extension of the stove, the front and top wall of the oven being openable and rigidly connected together, and the top wall being hinged at its rear edge to the rear wall of the oven said top wall having an opening, a closure for said opening, an arm attached to the top, a bracket attached to the back of the oven, and counterbalancing-weights connected to the arm by a cord running over the bracket adapted to assist in raising the top and front.

In testimony that I claim the foregoing as my own I affix my signature in presence of two witnesses.

VIRGIL W. BLANCHARD.

In presence of—
 JAMES R. MANSFIELD,
 L. E. WITHAM.